(12) United States Patent
Jung et al.

(10) Patent No.: US 11,976,223 B2
(45) Date of Patent: May 7, 2024

(54) ADHESIVE COMPOSITION, ADHESIVE SHEET AND IMAGE DISPLAY DEVICE PREPARED FROM THE SAME

(71) Applicant: DONGWOO FINE-CHEM CO., LTD., Jeollabuk-do (KR)

(72) Inventors: Kyoung Moon Jung, Jeollanam-do (KR); Hye Rim Kwon, Incheon (KR); Geon Shin, Incheon (KR); In Oh Hwang, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/978,557

(22) Filed: Nov. 1, 2022

(65) Prior Publication Data

US 2023/0137638 A1    May 4, 2023

(30) Foreign Application Priority Data

Nov. 2, 2021  (KR) .................. 10-2021-0148490

(51) Int. Cl.
| | | |
|---|---|---|
| *C09J 133/08* | (2006.01) | |
| *B32B 7/12* | (2006.01) | |
| B32B 17/10 | (2006.01) | |
| B32B 27/08 | (2006.01) | |
| B32B 27/28 | (2006.01) | |
| B32B 27/30 | (2006.01) | |
| B32B 27/32 | (2006.01) | |
| B32B 27/36 | (2006.01) | |
| B32B 27/38 | (2006.01) | |
| B32B 27/40 | (2006.01) | |
| C08K 5/372 | (2006.01) | |

(52) U.S. Cl.
CPC .............. *C09J 133/08* (2013.01); *B32B 7/12* (2013.01); *B32B 17/10* (2013.01); *B32B 27/08* (2013.01); *B32B 27/281* (2013.01); *B32B 27/285* (2013.01); *B32B 27/286* (2013.01); *B32B 27/302* (2013.01); *B32B 27/304* (2013.01); *B32B 27/306* (2013.01); *B32B 27/308* (2013.01); *B32B 27/32* (2013.01); *B32B 27/36* (2013.01); *B32B 27/365* (2013.01); *B32B 27/38* (2013.01); *B32B 27/40* (2013.01); *B32B 2255/10* (2013.01); *B32B 2255/26* (2013.01); *B32B 2307/412* (2013.01); *B32B 2307/42* (2013.01); *B32B 2307/7246* (2013.01); *B32B 2457/202* (2013.01); *B32B 2457/206* (2013.01); *B32B 2457/208* (2013.01); *C08K 5/372* (2013.01)

(58) Field of Classification Search
CPC .......... C09J 133/08; B32B 7/12; B32B 17/10; B32B 27/08; B32B 27/281; B32B 27/285; B32B 27/286; B32B 27/302; B32B 27/304; B32B 27/306; B32B 27/308; B32B 27/32; B32B 27/36; B32B 27/365; B32B 27/38; B32B 27/40; B32B 2255/10; B32B 2255/26; B32B 2307/412; B32B 2307/42; B32B 2307/7246; B32B 2457/202; B32B 2457/206; B32B 2457/208
See application file for complete search history.

(56) References Cited

U.S. PATENT DOCUMENTS

| | | | |
|---|---|---|---|
| 2010/0261018 A1* | 10/2010 | Turshani ................ | C09J 133/14 522/42 |
| 2018/0171080 A1* | 6/2018 | Namiki .................... | C09J 11/06 |
| 2020/0103694 A1* | 4/2020 | Daimatsu ................ | G02B 1/10 |

FOREIGN PATENT DOCUMENTS

| | | |
|---|---|---|
| KR | 10-2010-0039274 A | 4/2010 |
| KR | 10-1628118 B1 | 6/2016 |
| KR | 10-1988664 B1 | 6/2019 |

* cited by examiner

*Primary Examiner* — Callie E Shosho
*Assistant Examiner* — Bethany M Miller
(74) *Attorney, Agent, or Firm* — The PL Law Group, PLLC

(57) ABSTRACT

An adhesive composition according to an embodiment includes an acrylic copolymer, and a compound containing a sulfide group and having a refractive index of 1.57 or more. The adhesive sheet prepared from the adhesive composition may have a low glass transition temperature and high refractive index, such that an image display device may not include a separate high refractive index pattern layer.

12 Claims, 1 Drawing Sheet

ADHESIVE COMPOSITION, ADHESIVE SHEET AND IMAGE DISPLAY DEVICE PREPARED FROM THE SAME

CROSS-REFERENCE TO RELATED APPLICATION AND CLAIM OF PRIORITY

This application claims the benefit under 35 USC § 119 of Korean Patent Application No. 10-2021-0148490 filed on Nov. 2, 2021 in the Korean Intellectual Property Office, the entire disclosure of which is incorporated herein by reference for all purposes.

BACKGROUND

1. Field

The present invention relates to an adhesive composition, an adhesive sheet and an image display device prepared from the same. More particularly, the present invention relates to an adhesive composition including an acrylic copolymer, an adhesive sheet prepared therefrom and an image display device including an adhesive layer prepared from the adhesive composition.

2. Description of the Related Art

For example, in order to adhere a display panel of an image display device such as a liquid crystal display (LCD) device, an organic light emitting display (OLED) device, or the like with various optical structures or circuit structures, an adhesive or an adhesive sheet can be used. It is necessary for the adhesive to have improved transparency and excellent adhesiveness so as not to deteriorate optical properties of the image display device.

For example, the adhesive may be provided between the display panel and/or a touch panel and the optical structure to adhere these two devices.

However, since a step is generated during patterning sensing electrodes included in the display panel or a touch sensor layer, there is a need to dispose an encapsulation layer on the display panel or the touch sensor.

As a material of the encapsulation layer, a silicon-nitrogen material having a refractive index of about 2.0 may be used. However, in this case, a difference in the refractive index between the encapsulation layer and an adhesive for a polarizing plate, which has a refractive index of about 1.47, is large, such that reflection at an interface therebetween may be increased and luminance may be reduced.

To solve these problems, a process of separately coating a high refractive index layer between the encapsulation layer and the adhesive for a polarizing plate is widely used. However, in this case, problems that a thickness of the image display device is increased and process conditions are complicated may occur.

Accordingly, development of an adhesive for a polarizing plate having high refractive properties is required so that there is no need to provide a separate high refractive layer.

For example, Korean Patent Laid-Open Publication No. 2010-0039274 discloses an adhesive for a polarizing plate applied to the image display device, but fails to secure the above-described high refractive properties.

SUMMARY

According to an aspect of the present invention, there is provided an adhesive composition forming an adhesive layer having improved high refractive properties.

According to an aspect of the present invention, there is provided an adhesive sheet and an image display device each having improved high refractive properties.

(1) An adhesive composition including: an acrylic copolymer; and a compound containing a sulfide group and having a refractive index of 1.57 or more.

(2) The adhesive composition according to the above (1), wherein the compound includes a compound represented by Formula 1 below:

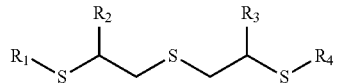

[Formula 1]

(in Formula 1, $R_1$ to $R_4$ are each independently a hydrogen atom, a substituted or unsubstituted alkyl group having 1 to 10 carbon atoms, a substituted or unsubstituted aryl group having 6 to 14 carbon atoms, a substituted or unsubstituted heteroalkyl group having 1 to 10 carbon atoms, a substituted or unsubstituted heteroaryl group having 6 to 14 carbon atoms, a substituted or unsubstituted arylalkyl group having 7 to 18 carbon atoms, or a substituted or unsubstituted heteroarylalkyl group having 7 to 18 carbon atoms).

(3) The adhesive composition according to the above (1), wherein the compound includes a compound represented by Formula 2 below:

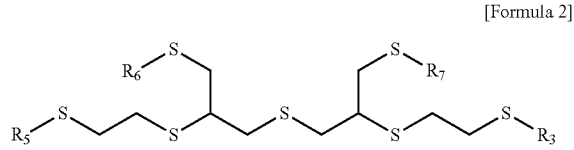

[Formula 2]

(in Formula 2, $R_5$ to $R_8$ are each independently a hydrogen atom, a substituted or unsubstituted alkyl group having 1 to 10 carbon atoms, a substituted or unsubstituted aryl group having 6 to 14 carbon atoms, a substituted or unsubstituted heteroalkyl group having 1 to 10 carbon atoms, a substituted or unsubstituted heteroaryl group having 6 to 14 carbon atoms, a substituted or unsubstituted arylalkyl group having 7 to 18 carbon atoms, or a substituted or unsubstituted heteroarylalkyl group having 7 to 18 carbon atoms).

(4) The adhesive composition according to the above (1), wherein the compound includes at least one of compounds represented by Formulas 3 to 6 below:

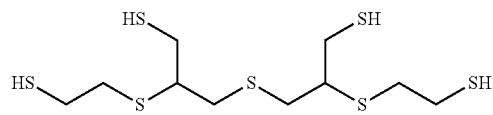

[Formula 3]

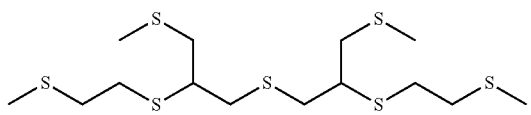

[Formula 4]

-continued

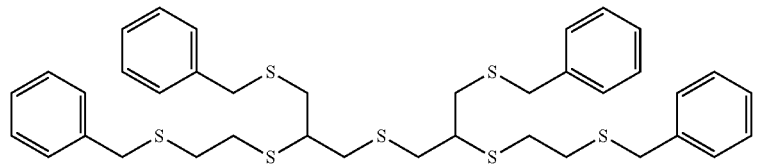
[Formula 5]

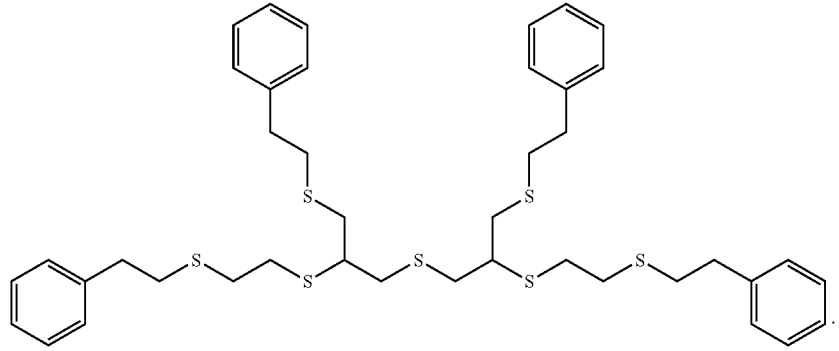
[Formula 6]

(5) The adhesive composition according to the above (1), wherein the compound is included in an amount of 0.1 to 20 parts by weight based on 100 parts by weight of the acrylic copolymer.

(6) The adhesive composition according to the above (1), wherein the compound is included in an amount of 0.5 to 15 parts by weight based on 100 parts by weight of the acrylic copolymer.

(7) The adhesive composition according to the above (1), wherein the acrylic copolymer includes a repeating unit derived from an acrylic monomer, and a homopolymer of the acrylic monomer has a refractive index of 1.50 or more.

(8) The adhesive composition according to the above (7), wherein the acrylic monomer includes at least one of pentabromophenyl (meth)acrylate, 2-(naphthalen-2-yloxy)ethyl (meth)acrylate, 2-(naphthalene-2-ylthio)ethyl (meth)acrylate, 1-ethoxylated phenol (meth)acrylate, biphenylmethyl (meth)acrylate, and 1-pyrenemethyl (meth)acrylate.

(9) The adhesive composition according to the above (1), wherein the compound includes a compound having a molecular weight of 300 to 10,000 g/mol.

(10) The adhesive composition according to the above (1), further including at least one of a photo-polymerization initiator and a thermal curing agent.

(11) An adhesive sheet including an adhesive layer formed from the adhesive composition according to the above (1).

(12) The adhesive sheet according to the above (11), wherein the adhesive layer has a refractive index of 1.57 or more.

(13) The adhesive sheet according to the above (11), wherein the adhesive layer has a haze value of less than 2%.

(14) An image display device including: a display panel; a touch sensor layer disposed on the display panel; a polarizing plate disposed on the touch sensor layer; and an adhesive layer formed between the touch sensor layer and the polarizing plate and prepared from the adhesive composition described above.

(15) The image display device according to the above (14), wherein the touch sensor layer includes a base layer, and touch sensing electrodes arranged on the base layer, and the adhesive layer fills spaces between the touch sensing electrodes and contacts directly with the polarizing plate.

The adhesive composition according to embodiments of the present invention includes a compound containing a sulfide group and having a refractive index of 1.57 or more. For example, the compound may contain a sulfide group to maintain or increase high refractive properties, while reducing an elastic modulus and a glass transition temperature (Tg) of the adhesive composition. In this case, a separate high refractive index pattern layer for correcting a difference in the refractive index between the sensing electrode and an optical member (e.g., a polarizing plate) in an image display device to be described below may not be required. Thereby, the process may be simplified, process costs may be reduced, and a thickness of the image display device may be decreased.

In some embodiments, the acrylic copolymer may include a repeating unit derived from an acrylic monomer, and a homopolymer of the acrylic monomer may have a refractive index of 1.50 or more. Accordingly, high refractive properties of the adhesive composition including the acrylic copolymer may be implemented.

DETAILED DESCRIPTION

Figure 1:
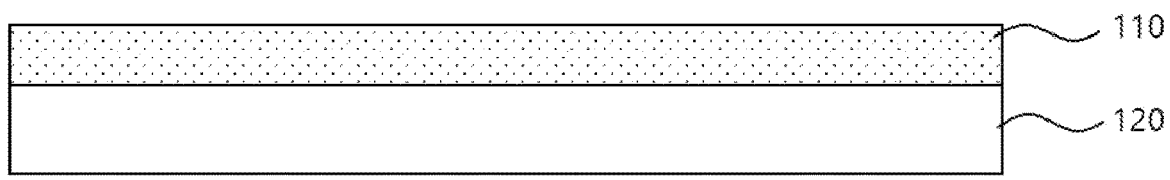
FIG. 1 is a schematic cross-sectional view for describing an adhesive sheet according to exemplary embodiments.

According to exemplary embodiments of the present invention, there is provided an antenna package in which an antenna unit, and a circuit board that may include a signal transmission wiring and a ground layer are combined. Further, an image display device including the antenna package is also provided.

Embodiments of the present invention provide an adhesive composition which includes a compound containing an acrylic copolymer, and a sulfide group having a refractive index of 1.57 or more, thereby maintaining or improving the elastic modulus and the glass transition temperature while implementing high refractive properties. In addition, embodiments of the present invention provide an adhesive sheet prepared from the adhesive composition and an image display device including an adhesive layer prepared from the adhesive composition.

Hereinafter, the present invention will be described in detail.

<Adhesive Composition>

The adhesive composition according to embodiments of the present invention includes an acrylic copolymer. For example, excellent adhesive properties and durability may be implemented through the acrylic copolymer.

In some embodiments, the acrylic copolymer may include a repeating unit derived from an acrylic monomer, and the refractive index of a homopolymer of the acrylic monomer may be 1.50 or more. Accordingly, high refractive properties of the adhesive composition including the acrylic copolymer may be implemented.

For example, the acrylic monomer may be a (meth)acrylate monomer, but it is not limited thereto. As used herein, the term "(meth)acrylate" is used as a meaning of encompassing acrylate or methacrylate.

In some embodiments, the homopolymer of the acrylic monomer having a refractive index of 1.50 or more, and the acrylic monomer may include at least one of pentabromophenyl (meth)acrylate, 2-(naphthalen-2-yloxy)ethyl (meth)acrylate, 2-(naphthalene-2-ylthio)ethyl (meth)acrylate, 1-ethoxylated phenol (meth)acrylate, biphenylmethyl (meth)acrylate, and 1-pyrenemethyl (meth)acrylate.

In some embodiments, the acrylic copolymer may further include a repeating unit derived from an acrylic monomer having a hydrocarbon group with 1 to 20 carbon atoms.

The acrylic monomer having a hydrocarbon group with 1 to 20 carbon atoms may be a (meth)acrylate monomer.

The hydrocarbon group may include, for example, an aliphatic hydrocarbon group and an aromatic hydrocarbon group. A hydrogen atom included in the hydrocarbon group may be substituted by an alkyl group, a halogen atom, an alkoxy group, a phenoxy group, etc., and —$CH_2$— included in the hydrocarbon group may be substituted by a hetero atom such as an oxygen atom, a sulfur atom, a nitrogen atom, etc., or by —$(CH_2CH_2O)m$—. In this case, m may be 1 to 4.

In some embodiments, the acrylic monomer having a hydrocarbon group with 1 to 20 carbon atoms may include at least one selected from the group consisting of methyl (meth)acrylate, ethyl (meth)acrylate, n-propyl (meth)acrylate, isopropyl (meth)acrylate, n-butyl (meth)acrylate, sec-butyl (meth)acrylate, t-butyl (meth)acrylate, isobutyl (meth)acrylate, pentyl (meth)acrylate, hexyl (meth)acrylate, 2-ethylhexyl (meth)acrylate, n-octyl (meth)acrylate, isooctyl (meth)acrylate, isobornyl acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, n-tetradecyl (meth)acrylate, pentafluorooctyl acrylate, 2-ethylhexyldiglycol acrylate, nonylphenol(4 mols of modified ethylene oxide)acrylate, and 6-(1-naphthyloxy)-1-hexylacrylate, and in terms of easiness of commercial availability, 2-ethylhexyl (meth)acrylate is preferably used.

In some embodiments, the acrylic monomer may be included in an amount of 80 to 99 parts by weight ('wt. parts') based on 100 wt. parts of whole monomers used to prepare the acrylic copolymer. Accordingly, it is possible to prevent a reduction in durability due to a decrease in cohesiveness while securing sufficient adhesiveness and adhesion of the adhesive composition.

In some embodiments, the acrylic copolymer may be polymerized by further including a cross-linkable monomer copolymerizable with the acrylic monomer.

For example, the cross-linkable monomer may include a carboxyl group-containing monomer, a phosphoric acid group-containing monomer, a sulfonic acid group-containing monomer, a cyano group-containing monomer, vinyl esters, an aromatic vinyl compound, an acid anhydride group-containing monomer, a hydroxyl group-containing monomer, an amide group-containing monomer, an amino group-containing monomer, an imide group-containing monomer, an epoxy group-containing monomer, an ether group-containing monomer or the like. These compounds may be used alone or in combination of two or more thereof.

Examples of the carboxyl group-containing monomer may include mono-valent acids such as (meth)acrylic acid, crotonic acid, isocrotonic acid, carboxyethyl (meth)acrylate, carboxypentyl (meth)acrylate, etc.; di-valent acids such as maleic acid, itaconic acid, fumaric acid, etc., and monoalkylesters thereof; 3-(meth)acryloylpropionic acid; a ring-opening adduct of succinic anhydride of 2-hydroxyalkyl (meth)acrylate having an alkyl group with 2 and 3 carbon atoms, a ring-opening adduct of succinic anhydride of hydroxylalkyleneglycol (meth)acrylate having an alkylene group with 2 to 4 carbon atoms, a compound prepared by ring-opening addition of succinic anhydride to a caprolactone adduct of 2-hydroxyalkyl (meth)acrylate having an alkyl group with 2 or 3 carbon atoms and the like. Among these, (meth)acrylic acid is preferably used.

Examples of the phosphoric acid group-containing monomer may include 2-hydroxyethyl acryloyl phosphate or the like.

Examples of the sulfonic acid group-containing monomer may include styrenesulfonic acid, allylsulfonic acid, 2-(meth)acrylamido-2-methylpropanesulfonic acid, (meth)acrylamidopropanesulfonic acid, sulfopropyl (meth)acrylate, (meth)acryloyloxynaphthalenesulfonic acid, sodium vinylsulfonate and the like.

Examples of the cyano group-containing monomer may include (meth)acrylonitrile or the like.

Examples of the vinyl esters may include vinyl acetate, vinyl propionate, vinyl laurate and the like.

Examples of the aromatic vinyl compound may include styrene, chlorostyrene, chloromethylstyrene, α-methylstyrene, other substituted styrenes and the like.

Examples of the acid anhydride group-containing monomer may include maleic anhydride, itaconic anhydride, acid anhydrides thereof and the like.

Examples of the hydroxyl group-containing monomer may include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methylacrylate, N-methylol (meth)acrylamide, vinyl alcohol, allyl alcohol, 2-hydroxyethyl vinyl ether, 4-hydroxybutyl vinyl ether, diethylene glycol monovinyl ether and the like.

Examples of the amino group-containing monomer may include aminoethyl (meth)acrylate, N,N-dimethylaminoethyl (meth)acrylate, N,N-dimethylaminopropyl (meth)acrylate, (meth)acryloylmorpholine and the like.

Examples of the imide group-containing monomer may include cyclohexylmaleimide, isopropylmaleimide, N-cyclohexylmaleimide, itaconimide and the like.

Examples of the epoxy group-containing monomer may include glycidyl (meth)acrylate, methyl glycidyl (meth)acrylate, allyl glycidyl ether and the like.

Examples of the ether group-containing monomer may include 2-methoxyethyl (meth)acrylate, 2-ethoxyethyl (meth)acrylate, butoxyethyl (meth)acrylate, phenoxyethyl (meth)acrylate, acryloylmorpholine and the like.

The cross-linkable monomer may be included in an amount of 0.05 to 10 wt. parts, and preferably 1 to 8 wt. parts based on 100 wt. parts of the whole monomer used in the preparation of the acrylic copolymer. Within the above range, adhesiveness and cohesiveness of the adhesive composition may be excellent, and adhesive durability of the cured product may be improved.

In addition, the acrylic copolymer may further include other polymerizable monomers known in the art in addition to the above monomers within a range with no deterioration in adhesiveness, for example, in an amount of 10 wt. parts or less based on 100 wt. parts of the whole monomers used in the preparation of the acrylic copolymer.

The method for preparing the acrylic copolymer is not particularly limited, and the acrylic copolymer may be prepared using methods commonly used in the art, such as bulk polymerization, solution polymerization, emulsion polymerization, suspension polymerization, or UV polymerization, etc., and solution polymerization or UV polymerization method is preferably used. In addition, it is possible to further use solvents, polymerization initiators, chain transfer agents for controlling a molecular weight, or the like, commonly used in the polymerization.

In some embodiments, the acrylic copolymer may have a weight average molecular weight (in terms of polystyrene, Mw) of 50,000 to 2,000,000 measured by gel permeation chromatography (GPC). Preferably, the weight average molecular weight may be 300,000 to 1,700,000. When the weight average molecular weight of the (meth)acrylate copolymer is less than 50,000, cohesiveness between the copolymers may be insufficient to cause a reduction in the adhesive durability. When the weight average molecular weight thereof exceeds 2,000,000, it may need a great amount of diluted solvent in order to secure desired workability during coating.

In exemplary embodiments, the adhesive composition may include a compound containing a sulfide group and having a refractive index of 1.57 or more. Preferably, the refractive index of the compound may be 1.60 or more.

For example, the compound may contain a sulfide group to maintain or increase high refractive properties, while reducing an elastic modulus and a glass transition temperature (Tg) of the adhesive composition. In this case, a separate high refractive index pattern layer for correcting a difference in the refractive index between a sensing electrode and an optical member (e.g., a polarizing plate) in an image display device may not be required. Thereby, the process may be simplified, process costs may be reduced, and the thickness of the image display device may be decreased.

In some embodiments, the compound may include a compound represented by Formula 1 below, but it is not limited thereto.

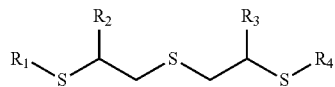

[Formula 1]

In Formula 1, $R_1$ to $R_4$ may be each independently a hydrogen atom, a substituted or unsubstituted alkyl group having 1 to 10 carbon atoms, a substituted or unsubstituted aryl group having 6 to 14 carbon atoms, a substituted or unsubstituted heteroalkyl group having 1 to 10 carbon atoms, a substituted or unsubstituted heteroaryl group having 6 to 14 carbon atoms, a substituted or unsubstituted arylalkyl group having 7 to 18 carbon atoms, or a substituted or unsubstituted heteroarylalkyl group having 7 to 18 carbon atoms.

When the compound contains at least three sulfide groups per molecule as shown in Formula 1, for example, the elastic modulus and the glass transition temperature of the adhesive composition may be sufficiently reduced. Accordingly, adhesive properties and flexibility of the adhesive sheet formed from the adhesive composition can be secured. In addition, the above-described elastic modulus and glass transition temperature may be reduced, while maintaining or improving the refractive index of the adhesive composition.

For example, the glass transition temperature of the adhesive composition may be −20° C. or lower. Accordingly, the adhesive sheet may be formed while sufficiently implementing the adhesive properties of the adhesive composition.

In some embodiments, the compound may include a compound represented by Formula 2 below.

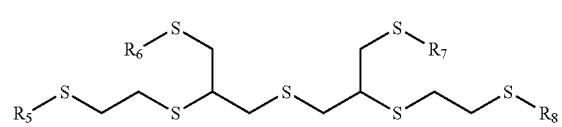

[Formula 2]

In Formula 2, $R_5$ to $R_8$ may be each independently a hydrogen atom, a substituted or unsubstituted alkyl group having 1 to 10 carbon atoms, a substituted or unsubstituted aryl group having 6 to 14 carbon atoms, a substituted or unsubstituted heteroalkyl group having 1 to 10 carbon atoms, a substituted or unsubstituted heteroaryl group having 6 to 14 carbon atoms, a substituted or unsubstituted arylalkyl group having 7 to 18 carbon atoms, or a substituted or unsubstituted heteroarylalkyl group having 7 to 18 carbon atoms.

When the compound contains at least 7 sulfide groups per molecule as shown in Formula 2, the elastic modulus and glass transition temperature of the adhesive composition may be further reduced. Accordingly, the adhesive properties of the adhesive layer formed from the adhesive composition may be further improved.

According to an embodiment, the compound may include at least one of compounds represented by Formulas 3 to 6 below.

[Formula 3]

[Formula 4]

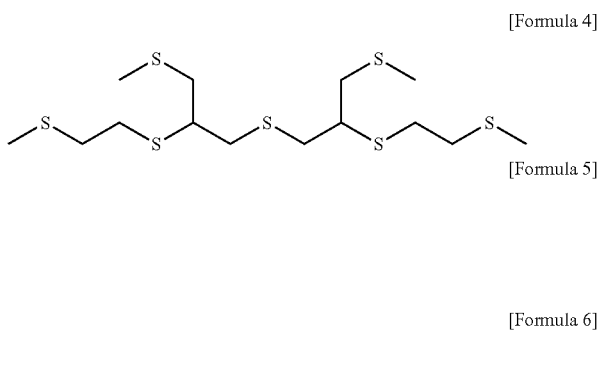

[Formula 5]

[Formula 6]

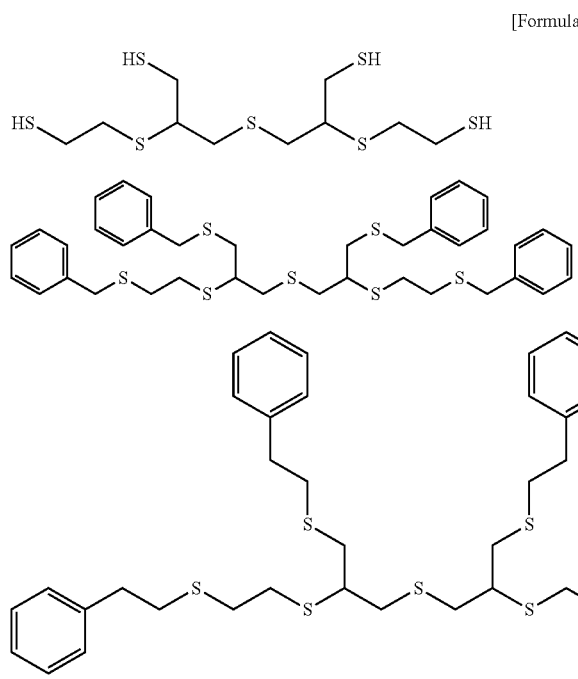

In some embodiments, the compound may be included in an amount of 0.1 to 20 wt. parts, and preferably 0.5 to 15 wt. parts based on 100 wt. parts of the above-described acrylic copolymer. In this case, it is possible to prevent a deterioration in the mechanical stability and reliability due to the excessive addition of the above-described compound, while sufficiently reducing the elastic modulus and the glass transition temperature of the adhesive composition.

In some embodiments, the compound may include a compound having a molecular weight of 300 to 10,000 g/mol. Accordingly, it is possible to prevent a decrease in the flexibility due to an excessively high molecular weight, while sufficiently reducing the elastic modulus and the glass transition temperature of the above-described adhesive composition.

In some embodiments, in order to polymerize the acrylic monomer and/or the cross-linkable monomer, a photo-polymerization initiator or a thermal curing agent may be used.

The photo-polymerization initiator may include, for example, benzoin, benzoin methylether, benzoin ethylether, benzoin isopropylether, benzoin-n-butylether, benzoin isobutylether, acetophenone, 1-hydroxycyclohexyl-1-phenylmethanone, hydroxydimethylacetophenone, dimethylaminoacetophenone, dimethoxy phenylacetophenone, 3-methylacetophenone, 2,2-dimethoxy-2-phenylacetophenone, 2,2-diethoxy-2-phenylacetophenone, 4-chronolocetophenone, 4,4-dimethoxyacetophenone, 2-hydroxy-2-methyl-1-phenylpropan-1-one, 4-hydroxycyclophenylketone, 1-hydroxycyclohexylphenylketone, 2-methyl-1-[4-(methylthio)phenyl]-2-morpholino-propan-1-one, oligo[2-hydroxy-2-methyl-1-(4-(1-methylvinyl)phenyl)propanone], 4-(2-hydroxyethoxy) phenyl-2-(hydroxy-2-propyl)ketone, benzophenone, p-phenylbenzophenone, 4,4-diaminobenzophenone, 4,4'-diethylaminobenzophenone, dichlorobenzophenone, anthraquinone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, diphenylketonebenzyl dimethyl ketal, acetophenone dimethyl ketal, p-dimethylaminobenzoic acid ester, 2,4,6-trimethylbenzoyldiphenylphosphine oxide (TPO), fluorene, triphenylamine, carbazole, azobisisobutyronitrile (AIBN) and the like. These compounds may be used alone or in combination of two or more thereof.

In some embodiments, the photo-polymerization initiator may be included in an amount of 0.01 to 3 wt. parts, and preferably 0.2 to 2 wt. parts based on 100 wt. parts of the acrylic copolymer.

The thermal curing agent, for example, is not particularly limited as long as it is a component capable of enhancing cohesiveness of the adhesive composition by appropriately cross-linking the acrylic copolymer, but an isocyanate cross-linking agent is preferably used.

The isocyanate cross-linking agent may include, for example, tolylene diisocyanate, xylene diisocyanate, hexamethylene diisocyanate, 2,4-diphenylmethane diisocyanate, 4,4-diphenylmethane diisocyanate, isophorone diisocyanate, tetramethylene xylene diisocyanate, naphthalene diisocyanate, addition type trimers such as a 2,4-toluene diisocyanate addition type trimer, or an isocyanurate trimer and the like.

The thermal curing agent is preferably included in an amount of 0.1 to 1 wt. part, and more preferably, in an amount of 0.1 to 0.5 wt. parts based on 100 wt. parts of the acrylic copolymer.

In some embodiments, the adhesive composition may further include different additives such as a cross-linking agent, a tackifier resin, an antioxidant, a corrosion-resistant agent, a leveling agent, a surface lubricant, a defoaming agent, a filler, a photo-stabilizer, a reaction initiator, a solvent, and the like, in order to control the adhesiveness, cohesiveness, viscosity, elastic modulus, glass transition temperature, and the like, required depending on uses thereof <Adhesive Sheet and Image Display Device>

Hereinafter, an adhesive sheet and an image display device including an adhesive layer formed from the above-described adhesive composition will be described.

FIG. 1 is a schematic cross-sectional view for describing an adhesive sheet according to exemplary embodiments.

Referring to FIG. 1, an adhesive sheet includes a base film 120 and an adhesive layer 110 formed on one surface of the base film 120. For example, the adhesive layer 110 may be formed by applying the above-described adhesive composition on one surface of the base film 120.

The base film 120 is not particularly limited, and a release film commonly used in the adhesive sheet may be used. For example, the base film 120 may include a polyester resin such as polyethylene terephthalate, polybutylene terephthalate, polyethylene naphthalate, polybutylene naphthalate, etc.; a polyimide resin; an acryl resin; a styrene resin such as polystyrene and acrylonitrile-styrene; a polycarbonate resin; a polylactic acid resin; a polyurethane resin; a polyolefin resin such as polyethylene, polypropylene, ethylene-propylene copolymer; a vinyl resin such as polyvinyl chloride, polyvinylidene chloride, etc.; a sulfone resin; a polyether-ether ketone resin; an allylate resin; or a release film formed of a mixture of the above-described resins.

The adhesive layer 110 may be formed by carrying out processes of applying the adhesive composition of the exemplary embodiments to one surface of the base film 120, and drying and/or curing the same. For example, the adhesive layer 110 may be formed by applying the adhesive composition on the base film 120 by a coating method such as roll coating, gravure coating, reverse coating, spray coating, air knife coating, die coater or the like.

In some embodiments, the base film 120 may be formed on upper and lower surfaces of the adhesive layer 110, respectively. For example, the base film 120 formed on the lower surface of the adhesive layer 110 may be removed and the exposed surface of the adhesive layer 110 may be attached to an object. Thereafter, a laminate (e.g., an image display device) may be formed by removing the base film 120 formed on the upper surface and attaching another object to the exposed surface of the adhesive layer 110.

In some embodiments, the adhesive layer 110 may have a refractive index of 1.57 or more. In this case, the adhesive layer 110 can secure a high refractive index while having a low glass transition temperature and elastic modulus. Accordingly, there may be no need to form a separate high refractive index pattern layer, while relieving a difference in the refractive index between a sensing electrode and an optical member in the image display device.

In some embodiments, the adhesive layer 110 included in the adhesive sheet may have a haze of less than 2%. In this case, light transmittance is improved, such that the adhesive layer may be particularly suitably provided as an optical adhesive for a display device and the like.

The term "haze value" as used herein may refer to a value obtained by adhering the adhesive layer 110 to slide glass and measuring a haze value according to the measurement standard of JIS K-713 at 25° C., and then subtracting the haze value (0.2%) of the slide glass from the measured haze value.

Figure 2:
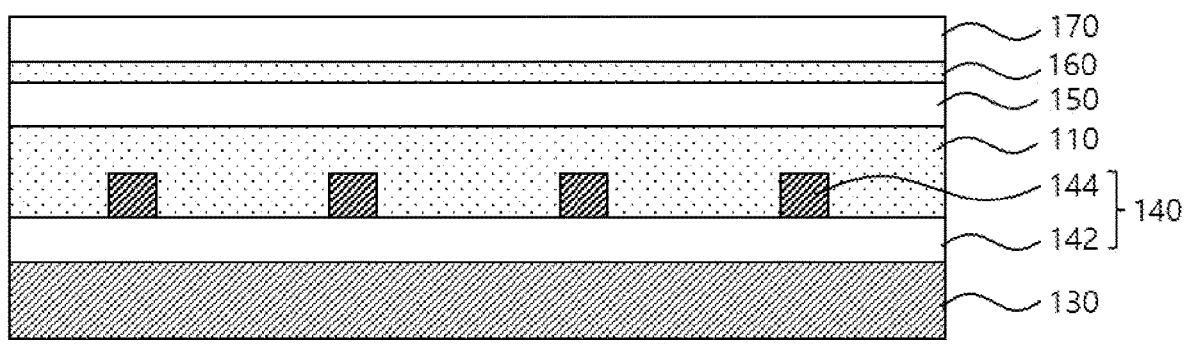
FIG. 2 is a schematic cross-sectional view for describing an image display device according to exemplary embodiments.

FIG. 2 is a schematic cross-sectional view for describing an image display device according to exemplary embodiments.

Referring to FIG. 2, the image display device may include a display panel 130, a touch sensor layer 140 disposed on the display panel, a polarizing plate 150 disposed on the touch sensor layer 140, and an adhesive layer 110 formed between the touch sensor layer 140 and the polarizing plate 150, and prepared from the adhesive composition according to the embodiments.

In this case, the adhesive layer 110 having a high refractive index and excellent adhesive properties may be disposed between the touch sensor layer 140 and the polarizing plate 150 to relieve a difference in the refractive index between the two layers. Thereby, the difference in the refractive index may be relieved with only the adhesive layer 110 without forming a separate refractive index-relaxing layer. Accordingly, a thickness of the image display device may be decreased, the process may be simplified, and process costs may be reduced.

The display panel 130 may be, for example, a liquid crystal display (LCD) panel or an organic light emitting display (OLED) panel.

The polarizing plate 150 may include, for example, a polarizer and a protective film adhered to at least one surface of the polarizer. For example, the adhesive layer may be formed by adhering an adhesive sheet to the protective film, or may be directly applied to the protective film.

The protective film included in the polarizing plate 150 is not particularly limited as long as it has excellent transparency, mechanical strength, thermal stability, moisture-shielding properties, isotropic properties and the like. Specifically, the protective film may include polyester films such as polyethylene terephthalate, polyethylene isophthalate, polybutylene terephthalate, etc.; cellulose films such as diacetylocellulose, triacetylcellulose, etc.; polycarbonate films; acryl films such as polymethyl (meth)acrylate, polyethyl (meth)acrylate, etc.; styrene films such as polystyrene, acrylonitrile-styrene copolymer, etc.; polyolefin films; vinyl chloride films; polyamide films such as nylon, aromatic polyamide, etc.; polyimide films; sulfone films; polyether-ketone films; polyphenylene sulfide films; vinyl alcohol films; vinylidene chloride films; vinyl butyral films; allylate films; polyoxymethylene films; urethane films; epoxy films; silicon films and the like.

The polarizer may be a polarizer known in the art, and for example, may be manufactured through processes such as swelling, dyeing, cross-linking, stretching, washing with water, and drying a polyvinyl alcohol film.

In some embodiments, the touch sensor layer 140 includes a base layer 142 and touch sensing electrodes 144 arranged on the base layer 142, and the adhesive layer 110 may fill spaces between the touch sensing electrodes 144 to come into direct contact with the polarizing plate 150. In this case, by removing a step generated due to the patterning of the touch sensing electrodes 144, adhesion between the touch sensor layer 140 and the polarizing plate 150 may be improved. Accordingly, the mechanical stability of the image display device may be improved.

For example, the image display device may further include other components known in the art in addition to the above-described components. For example, the image display device may further include a retardation film, a hard coating film, a protective film, a window film, a touch panel and the like.

As shown in FIG. 2, the image display device may further include, for example, a cover window 170 on the polarizing plate 150. The polarizing plate 150 and the cover window 170 may be adhered to each other through an upper adhesive layer 160.

The cover window 170 may be used without limitation thereof as long as it is employed in the art to protect internal components of the image display device, and may be, for example, glass.

For example, the display panel 130, the touch sensor layer 140, and optical members may be laminated using the adhesive layer 110 formed from the above-described adhesive composition. In this case, since the adhesive layer 110 itself relieves a difference in the refractive index between the display panel 130 and the optical member (e.g., the polarizing plate 150), there may be no need to form a separate high refractive index pattern layer in the image display device. Accordingly, the thickness of the image display device may be decreased, and workability may be enhanced, while improving the luminance of the image display device.

Hereinafter, specific experimental examples are proposed to facilitate understanding of the present invention. However, the following examples are only given for illustrating the present invention and those skilled in the art will obviously understand that various alterations and modifications are possible within the scope and spirit of the present invention.

Such alterations and modifications are duly included in the appended claims.

Example 1

A monomer mixture including 70 wt. parts of 1-ethoxylated-o-phenylphenol acrylate, 25 wt. parts of 1-ethoxylated phenol acrylate, and 5 wt. parts of 2-hydroxyethyl acrylate was introduced into 1 L reactor equipped with a cooling device for easy control of temperature, in which a nitrogen gas is refluxed. Then, 300 wt. parts of methyl ethyl ketone as a solvent was introduced therein. Thereafter, nitrogen gas was introduced for 1 hour to remove oxygen and replaced therewith, then the temperature was maintained at 70° C. The monomer mixture was uniformly stirred, then 0.07 wt. parts of azobisisobutyronitrile (AIBN) as a reaction initiator was introduced into the reactor, followed by performing a reaction for 8 hours to prepare an acrylic copolymer having a weight average molecular weight of 1,460,000.

5 wt. parts of the compound represented by Formula 3 of the present disclosure as a compound was added to the prepared acrylic copolymer, and 0.5 wt. parts of an isocyanate cross-linking agent (AK75, Aekyung Chemical) was further added thereto to prepare an adhesive composition. At this time, the added compound had a molecular weight of 366.7 g/mol, and a refractive index of 1.647.

A polyethylene terephthalate (PET) film having a thickness of 75 μm subjected to release treatment of a coating solution was coated with the adhesive composition using a bar coater. Thereafter, adhesive composition was dried at 100° C. for 2 minutes, and then cured at room temperature for 7 days to prepare an adhesive sheet including an adhesive layer having a thickness of 25 μm.

Example 2

An adhesive composition and an adhesive sheet were prepared according to the same procedures as described in Example 1, except that the adhesive composition was prepared having ingredients and contents shown in Table 1 below.

Example 3

An acrylic copolymer was prepared by introducing 70 wt. parts of phenoxybenzyl acrylate, 25 wt. parts of 2-acryloyloxyethyl 2-hydroxyethyl phthalate, and 5 wt. parts of 2-hydroxyethyl acrylate into the reactor.

5 wt. parts of the compound represented by Formula 4 of the present disclosure was added to the prepared acrylic copolymer, and 0.5 wt. parts of (1-hydroxycyclohexyl) phenylketone (Irgacure®-184) as an initiator was added thereto to prepare an adhesive composition. At this time, the added compound had a molecular weight of 422.8 g/mol, and a refractive index of 1.621.

A polyethylene terephthalate (PET) film having a thickness of 75 μm subjected to release treatment of a coating solution was coated with the adhesive composition using a bar coater. Thereafter, by irradiating the coated film with ultraviolet rays for 10 minutes using a UV lamp to cure the same, an adhesive sheet including an adhesive layer having a thickness of 25 μm was prepared.

Examples 4 and 5

Adhesive compositions and adhesive sheets were prepared according to the same procedures as described in Example 3, except that the adhesive compositions were prepared having ingredients and contents shown in Table 1 below. At this time, the compound (compound represented by Formula 5 of the present disclosure) added in Example 4 had a molecular weight of 727.2 g/mol, and a refractive index of 1.641. In addition, the compound (compound represented by Formula 6 of the present disclosure) added in Example 5 had a molecular weight of 783.3 g/mol, and a refractive index of 1.635.

Examples 6 and 7

Adhesive compositions and adhesive sheets were prepared according to the same procedures as described in Example 3, except that the adhesive compositions were prepared having ingredients and contents shown in Table 1 below.

Examples 8 to 10

Adhesive compositions and adhesive sheets were prepared according to the same procedures as described in Example 3, except that the adhesive compositions were prepared having ingredients and contents shown in Table 1 below.

Comparative Examples 1 to 3

An adhesive composition and an adhesive sheet were prepared according to the same procedures as described in Example 3, except that the adhesive composition was prepared having ingredients and contents shown in Table 2 below.

The added compound in Comparative Example 3 had a refractive index of 1.446.

TABLE 1

| Unit: wt. parts | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Acrylic copolymer | Acrylic monomer | A1 | 70 | 70 | | | | 70 | 70 | | | |
| | | A2 | | | 70 | 70 | 70 | | | 70 | 70 | |
| | | A3 | 25 | 25 | | | | 25 | 25 | | | |
| | | A4 | | | 25 | 25 | 25 | | | 25 | 25 | |
| | | A5 | | | | | | | | | | 95 |
| | Cross-linkable monomer | B1 | 5 | | 5 | 5 | 5 | 5 | 5 | 5 | 5 | |
| | | B2 | | 5 | | | | | | | | 5 |
| Compound | | C1 | 5 | 10 | | | | 0.05 | 21 | | | 5 |
| | | C2 | | | 5 | | | | | 0.4 | 16 | |
| | | C3 | | | | 5 | | | | | | |
| | | C4 | | | | | 5 | | | | | |
| | | C5 | | | | | | | | | | |
| Photo-polymerization initiator | | D1 | | | 0.5 | 0.5 | 0.5 | 0.5 | 0.5 | 0.5 | 0.5 | 0.5 |
| Thermal curing agent | | E1 | 0.5 | 0.5 | | | | | | | | |

A1: 1-ethoxylated-o-phenylphenol acrylate (homopolymer refractive index: 1.577, Tg: 27° C.) (Daelim Chemical)
A2: Phenoxybenzyl acrylate (homopolymer refractive index: 1.565, Tg: 22° C.) (Daelim Chemical)
A3: 1-ethoxylated phenol acrylate (homopolymer refractive index: 1.516, Tg: −22° C.) (Daelim Chemical)
A4: 2-acryloyloxyethyl 2-hydroxyethyl phthalate (homopolymer refractive index: 1.523, Tg: −12° C.) (Kongyeongsa Co.)
A5: 2-ethylhexyl acrylate (homopolymer refractive index: 1.466, Tg: −74° C.) (BASF Co.)
B1: 2-hydroxyethyl acrylate (homopolymer refractive index: 1.448, Tg: −15° C.) (Kongyeongsa Co.)
B2: Acrylic acid
C1: Compound represented by formula 3 (molecular weight: 366.7 g/mol, refractive index: 1.647)
C2: Compound represented by formula 4 (molecular weight: 422.8 g/mol, refractive index: 1.621)
C3: Compound represented by Formula 5 (molecular weight: 727.2 g/mol, refractive index: 1.641)
C4: Compound represented by formula 6 (molecular weight: 783.3 g/mol, refractive index: 1.635)
C5: di(2-ethylhexyl) adipate (molecular weight: 370.0 g/mol, refractive index: 1.446)
D1: (1-hydroxycyclohexyl)phenylketone (Irgacure ®-184)
E1: Isocyanate cross-linking agent (AK75) (Aekyung Chemical)

TABLE 2

| Unit: wt. parts | | | Comparative Example | | |
|---|---|---|---|---|---|
| | | | 1 | 2 | 3 |
| Acrylic copolymer | Acrylic monomer | A1 | | 70 | 70 |
| | | A2 | | | |
| | | A3 | | 25 | 25 |
| | | A4 | | | |
| | | A5 | 95 | | |
| | Cross-linkable monomer | B1 | | 5 | 5 |
| | | B2 | 5 | | |
| Compound | | C1 | | | |
| | | C2 | | | |
| | | C3 | | | |
| | | C4 | | | |
| | | C5 | | | 5 |
| Photo-polymerization initiator | | D1 | 0.5 | 0.5 | 0.5 |
| Thermal curing agent | | E1 | | | |

Definitions of A1 to A5, B1, B2, C1 to C5, D1 and E1 are the same as those described in Table 1.

Experimental Example (1) Evaluation of Transparency

In the adhesive sheets according to the above-described examples and comparative examples, the adhesive layer was peeled off from the PET film and the exposed surface thereof was adhered to slide glass (manufactured by Matsunami Glass Kogyo, model number: S1111), respectively.

Haze values (%) were measured according to the standard of JISK-7136 using "Reflectance/Transmittance Meter HR-100 Type" manufactured by Murakami Shiki Co., Ltd. at 25° C.

Values obtained by subtracting the haze value (0.2%) of the slide glass from the measured values were evaluated as the haze values of the adhesive layers. Evaluation results are shown in Table 3 below.

○: Haze value is less than 2%
X: Haze value is 2% or more (2) Evaluation of refractive index The adhesive layers according to the above-described examples and comparative examples were irradiated with sodium D-line under an atmosphere of 25° C., and the refractive indexes were measured with an Abbe Refractometer (manufactured by ATAGO, DMM4). Measurement results are shown in Table 3 below.

◉: Refractive index is 1.59 or more.
○: Refractive index is 1.57 or more and less than 1.59.
Δ: Refractive index is 1.55 or more and less than 1.57.
X: Refractive index is less than 1.55.

(3) Evaluation of step absorption

The adhesive sheets according to the above-described examples and comparative examples were adhered to glass having a printed step of 3 μm. At this time, the glass on the inside had a size of 5 cm×10 cm×0.7 cm.

Thereafter, the adhesive sheets adhered to the glass were left at 85° C., 40° C., and room temperature (23° C.) for 24 hours, respectively, and a peeling-off state was evaluated by visually observing the surface to which the adhesive layer was adhered. Evaluation results are shown in Table 3 below.

◉: There is no peeling-off at 85° C.
○: There is no peeling-off at 40° C.
Δ: There is no peeling-off at room temperature.
X: Peeling-off at room temperature was observed.

(4) Evaluation of high temperature reliability

Laminates were prepared by laminating the adhesive sheets according to the above-described examples and comparative examples to be disposed between a polarizing plate and a PET film, respectively. The laminate was left for 10 days under high temperature and high humidity environments (85° C., 85% relative humidity), then high-temperature reliability was evaluated by visually observing whether bubbles and/or exfoliation occurred. Evaluation results are shown in Table 3 below.

◎: There is no bubble or exfoliation.
○: Less than 5 bubbles or exfoliations were observed.
Δ: 5 or more and less than 10 bubbles or exfoliations were observed.
X: 10 or more bubbles or exfoliations were observed.

TABLE 3

| Division | Example | | | | | | | | | | Comparative Example | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Transparency | ○ | ○ | ○ | ○ | ○ | ○ | ○ | ○ | ○ | ○ | ○ | ○ | ○ |
| Refractive index | ○ | ◎ | ○ | ○ | ○ | ○ | ◎ | ○ | ◎ | Δ | X | X | X |
| Step absorption | ○ | ◎ | ○ | ○ | ○ | Δ | ◎ | ○ | ○ | ◎ | ◎ | Δ | ○ |
| High temperature reliability | ◎ | ○ | ◎ | ◎ | ◎ | ○ | Δ | ○ | ○ | ○ | ◎ | ○ | ○ |

◎: There is no bubble or exfoliation.
○: Less than 5 bubbles or exfoliations observed.
Δ: 5 or more and less than 10 bubbles or exfoliations were observed.
X: 10 or more bubbles or exfoliations were observed.

Referring to Table 3 above, the adhesive layers and the adhesive sheets of the examples formed of the adhesive composition prepared by adding a compound having a refractive index of 1.57 or more and containing a sulfide group exhibited excellent transparency, refractive index, step absorption and high temperature reliability, respectively.

Accordingly, it is possible to implement an adhesive composition, an adhesive layer, and an adhesive sheet having both excellent adhesive properties and high refractive properties.

However, the adhesive layers and the adhesive sheets according to the comparative examples had a remarkably lowered refractive index, and thus could not function as a refractive index-relaxing layer between the sensing electrode and the optical member. In the case of Comparative Example 2, absorption was reduced to cause a decrease in adhesion.

What is claimed is:

1. An adhesive composition comprising:
an acrylic copolymer; and
a compound containing a sulfide group and having a refractive index of 1.57 or more,
wherein the compound comprises at least one of compounds represented by Formulas 4 to 6:

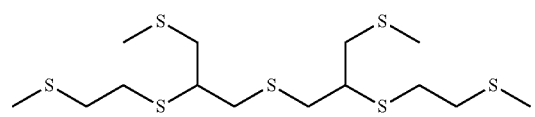

[Formula 4]

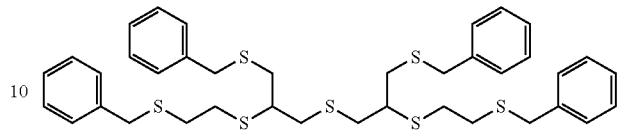

[Formula 5]

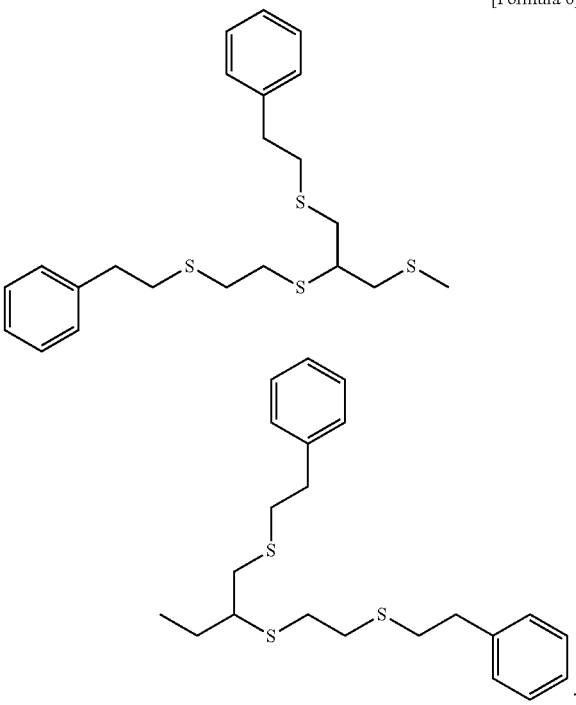

[Formula 6]

2. The adhesive composition according to claim 1, wherein the acrylic copolymer comprises a repeating unit derived from an acrylic monomer; and
a homopolymer of the acrylic monomer has a refractive index of 1.50 or more.

3. The adhesive composition according to claim 2, wherein the acrylic monomer comprises at least one selected from the group consisting of pentabromophenyl (meth)

acrylate, 2-(naphthalen-2-yloxy)ethyl (meth)acrylate, 2-(naphthalene-2-ylthio)ethyl (meth)acrylate, 1-ethoxylated phenol (meth)acrylate, biphenylmethyl (meth)acrylate, and 1-pyrenemethyl (meth)acrylate.

4. The adhesive composition according to claim 1, wherein the compound comprises a compound having a molecular weight of 300 to 10,000 g/mol.

5. The adhesive composition according to claim 1, wherein the compound is included in an amount of 0.1 to 20 parts by weight based on 100 parts by weight of the acrylic copolymer.

6. The adhesive composition according to claim 1, wherein the compound is included in an amount of 0.5 to 15 parts by weight based on 100 parts by weight of the acrylic copolymer.

7. The adhesive composition according to claim 1, further comprising at least one selected from the group consisting of a photo-polymerization initiator and a thermal curing agent.

8. An adhesive sheet comprising an adhesive layer formed from the adhesive composition according to claim 1.

9. The adhesive sheet according to claim 8, wherein the adhesive layer has a refractive index of 1.57 or more.

10. The adhesive sheet according to claim 8, wherein the adhesive layer has a haze value of less than 2%.

11. An image display device comprising:
a display panel;
a touch sensor layer disposed on the display panel;
a polarizing plate disposed on the touch sensor layer; and
an adhesive layer formed between the touch sensor layer and the polarizing plate and prepared from the adhesive composition according to claim 1.

12. The image display device according to claim 11, wherein the touch sensor layer comprises a base layer, and touch sensing electrodes arranged on the base layer, and
the adhesive layer fills spaces between the touch sensing electrodes and contacts directly with the polarizing plate.

* * * * *